J. Hyde,
Raising Sunken Vessels.

No. 13,463.        Patented Aug. 21, 1855.

2 Sheets. Sheet 1.

Witnesses.
Andrew De Lacy
Wm H Bishop

Inventor.
Joseph T Hyde

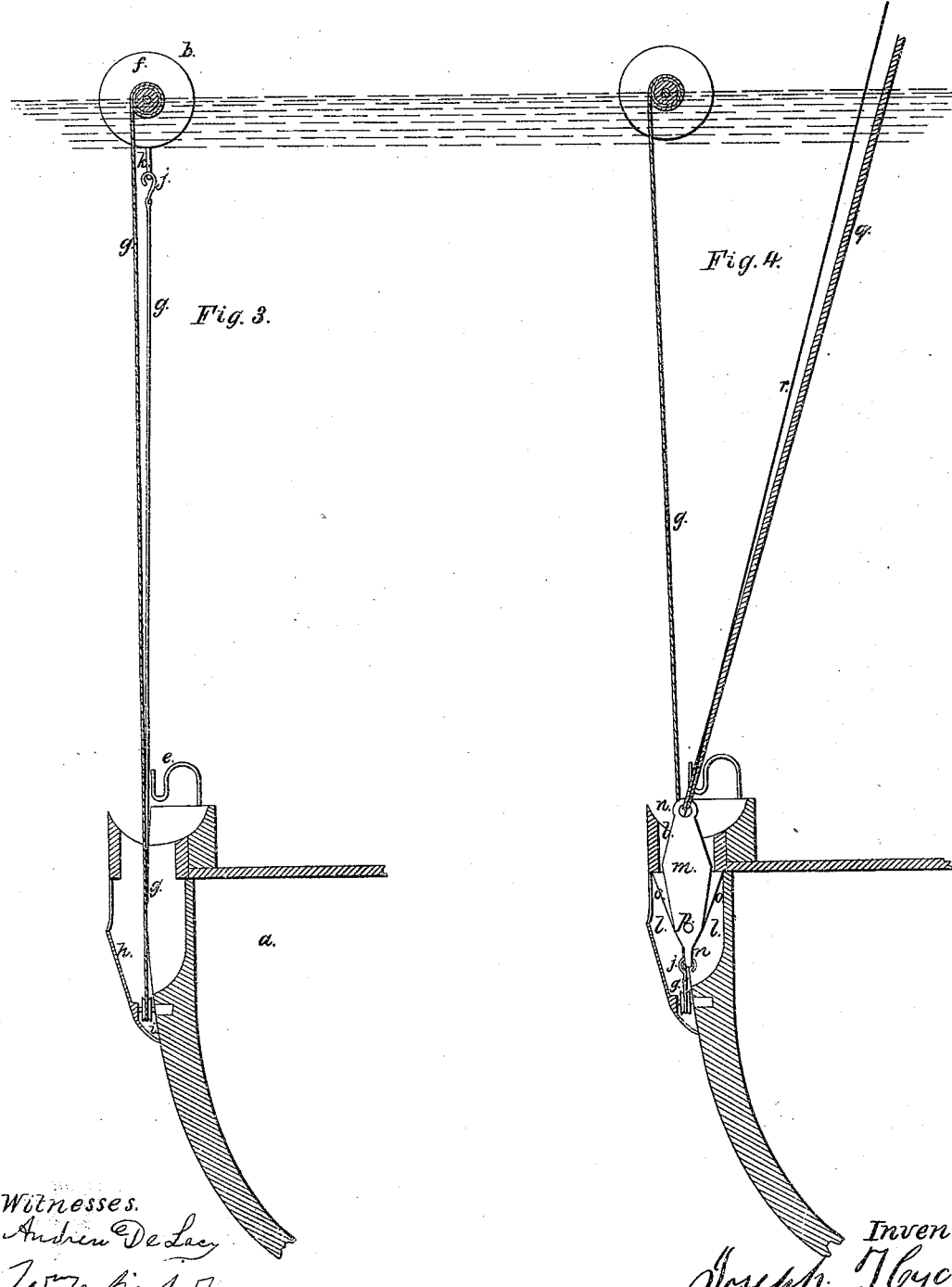

UNITED STATES PATENT OFFICE.

JOSEPH HYDE, OF NEW YORK, N. Y.

IMPROVED APPARATUS FOR VESSELS TO INDICATE THEIR LOCALITY WHEN THEY SINK AND TO SUPPLY A MEANS OF RAISING THEM.

Specification forming part of Letters Patent No. 13,463, dated August 21, 1855.

*To all whom it may concern:*

Be it known that I, JOSEPH HYDE, of the city, county, and State of New York, have invented a new and Improved Method of Indicating the Locality of and Getting Access to Sunken Vessels, of which the following is a full, clear, and exact description thereof, reference being had to the accompanying drawings, making part of this specification, in which—

Figure 1:
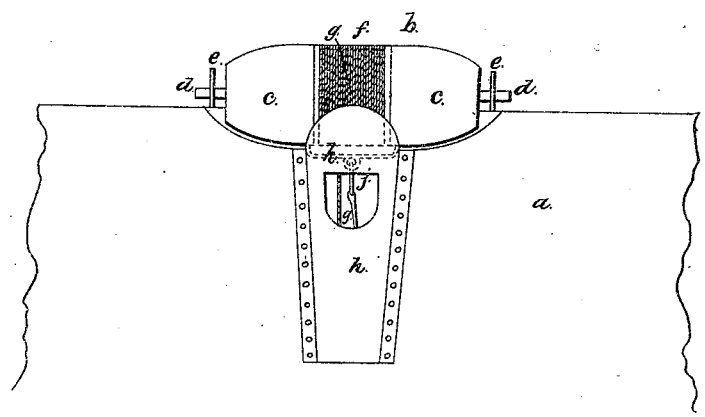
Figure 2:
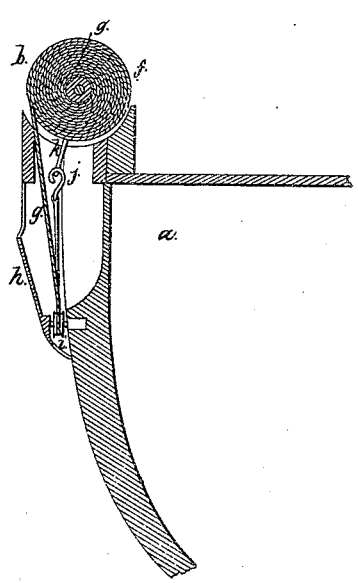

Figure 1 is a side elevation of a part of a vessel with my invention applied thereto; Figs. 2 and 3, cross vertical sections in two different conditions of the buoy; Fig. 4, a like section representing the mode of applying a grapple for raising the vessel, and Fig. 5 a like section representing part of my invention as applied to getting hose from flexible bags or camels to the surface of the water.

The object of my invention is to overcome the difficulties heretofore experienced in ascertaining the exact locality of sunken vessels, and also in forming a connection with them, or with safes or other valuables within them when sunken for the purpose of raising them; and to these ends the nature of my invention consists in the employment of a buoy or buoys connected with the vessel or with a safe or other article within the vessel by means of a cord or cords or equivalent therefor, so arranged that when the vessel sinks such buoy or buoys shall be free to float on the surface of the water and retain its connection with the vessel or article within the vessel, thus indicating the locality of the sunken vessel; and my said invention also consists in the employment of a socket or sockets attached to the vessel or any article therein to receive a grapple drawn into it by the buoy-cord as a means of connecting chains or cables with a sunken vessel or any article within it, to which chain or cable power may be applied to raise such vessel or article to the surface.

In Figs. 1, 2, and 3 of the accompanying drawings, *a* represents a section of a vessel, and *b* a buoy, made of wood or hollow metal or other suitable material which will float on water. This buoy is made in two parts *c c*, connected by an arbor having journals *d d* at each end, which rest and turn in open boxes *e e* on the railing of the vessel. The boxes should be of sufficient depth to prevent the buoy from being knocked or blown out of place and open at top, that the journals may come out freely, so that when the vessel sinks the buoy will float and remain on the surface of the water. To the arbor and between the two parts of the buoy is fitted a spool *f*, which turns thereon freely, and to the barrel of this spool is attached one end of a cord, rope, or chain *g*, of sufficient strength to hold the buoy under the action of wind and waves.

To the side of the vessel is fitted a metal socket *h*, firmly secured to the timbers, that sufficient power may be applied to a number of them arranged at the sides to raise the vessel. Near the bottom of this socket a pulley *i* is suitably mounted, around which the cord, rope, or chain *g* from the spool passes, the other end being provided with a hook *j*, which takes hold of an eye or loop *k* on the buoy. When the cord *g* is wound up on the spool, the journals rest in the boxes, and the buoy lies snugly in a suitable recess made for it in the ship's railings, so as not to be an incumbrance. The cord *g* being connected by one end with the buoy and by the other with the spool which makes part of the buoy and wound up on the body of the spool, which is free to turn on the arbor of the buoy as the vessel sinks, the spool will turn to give out the cord, that the buoy may remain on the surface of the water notwithstanding it continues to be connected with the vessel. In this way, no matter where or to what depth a vessel may sink, the place will be indicated and the means presented for getting access to it.

The sockets *h* are formed with recesses *l l*, (see Fig. 4 of the accompanying drawings,) and the upper end, above the recesses, is beveled, as represented, to facilitate the insertion of a metallic grapple or holdfast *m*, which is made of iron or other strong material, of a conical form, with a loop or eye *n* at each end. This grapple is provided with two catches *o o*, fitted to work in a mortise and both turning on a fulcrum-pin *p* near the lower end. A spring is interposed between the two, the tension of which forces their upper ends to a suitable distance outside of the conical body, as represented in the figure. The upper loop or eye *n* is secured to one end of a strong chain or cable *q*, and the loop or eye at the lower or conical end is secured to the end of the cord $g$ of the buoy by the hook $j$, and by pulling on the cord $g$ the grapple will be drawn down and into the socket until the spring-catches enter the recesses of the socket, and thus secure the chain or cable to the vessel, so that by lighters or other suitable means the required power can be applied to raise the vessel to the surface or tow her toward shore. Any required number of sockets, with their buoys and other fixtures, can be applied to a vessel.

The catches of the grapple are connected at their upper and inner ends with a small cord $r$, which passes through a hole in the upper end of the grapple, by pulling which the catches will be drawn in to disengage the grapple.

It will be obvious that instead of attaching the sockets with their appendages to the vessel they may be attached to safes or other articles containing valuables on board vessels, so that such safes or other articles can be drawn up instead of raising the vessel. In such cases the cord $g$, forming the connection with the buoy, should pass through suitable hatchways in the deck or decks of the vessel.

It will be obvious from the foregoing that the buoy can be employed, if desired, and in like manner, to draw down and connect camels or casks with a sunken vessel for the purpose of raising it.

Figure 5:
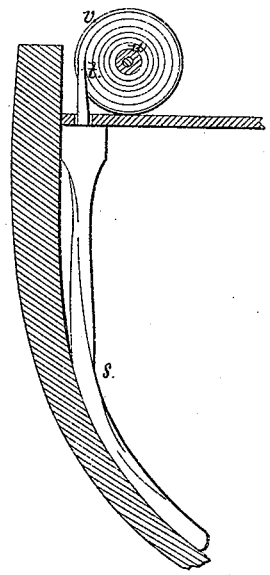

In Fig. 5 of the accompanying drawings, $s$ represents one of a series of bags or camels made of flexible material—say india-rubber cloth—attached to the under side of the deck and lying along the side of the vessel and provided with a hose $t$, through which air may be forced to inflate the bag or camel for the purpose of raising the vessel. A number of these bags or camels can be properly attached and located in the vessel.

The extremity of the hose is to be closed or provided with a valve in the usual way, not necessary to describe, and this end is to pass through a hole in the deck, and then attached to a reel $u$, mounted in a float or buoy $v$, located just over the hole through which the hose passes, so that when a vessel sinks with the bags or camels the buoys will float on the surface of the water and carry with them the end of the hose, not only indicating the locality of the vessel, but admitting of forming the necessary connection for forcing air into the bags or flexible camels to raise or aid in raising the vessel.

I am aware that on some occasions in throwing guns, anchors, and other heavy articles overboard to lighten ships at sea cords with floats have been previously attached to indicate their locality when sunken; but I am not aware that buoys specially provided have ever been arranged and connected with a vessel or anything within it so as to remain so connected and give out the connecting-cord to remain on the surface of the water as the vessel sinks to indicate its locality and afford the means of forming the necessary connection for raising the vessel, &c., to the surface, and therefore I do not claim, broadly, the use of floats to indicate the locality of sunken articles.

I do not wish to be understood as limiting myself to the special construction of the buoys nor to the special manner of arranging the cord which forms the connection between the buoy and the socket or the hose, nor to the special construction of or mode of attaching the socket to the vessel or safe, nor to the mode of making the flexible bags or camels and hose, nor to the special construction of the grapple, as all these may be varied without changing the character of my invention.

What I claim as my invention, and desire to secure by Letters Patent, is—

1. The mode of operation, substantially as herein described, for indicating the locality of sunken vessels by means of a buoy or buoys connected and combined with the vessel by means of a cord or cords, or the equivalent therefor, attached to the buoy, and a windlass, or equivalent thereof, and connected with the vessel or some valuable within the same, substantially as specified.

2. The mode of operation, substantially as described, for connecting cables or chains with sunken vessels or articles therein by means of the socket or any equivalent therefor, and the grapple or any equivalent therefor, operated by the buoy-cord, as set forth, and for the purpose specified.

JOSEPH HYDE.

Witnesses:
WM. H. BISHOP,
ANDREW DE LACY.